United States Patent [19]

Rayis

[11] Patent Number: 5,392,183
[45] Date of Patent: Feb. 21, 1995

[54] SERVICE CASSETTE EXTENSION FOR VIDEO CASSETTE RECORDER, PLAYER AND CAMERA

[76] Inventor: Yousif I. Rayis, 1720 Westwood, Maidson Heights, Mich. 48071

[21] Appl. No.: 159,444

[22] Filed: Nov. 29, 1993

[51] Int. Cl.$^6$ .............................................. G11B 23/02
[52] U.S. Cl. .................................................... 360/137
[58] Field of Search ........................ 360/137, 132, 128

[56] References Cited

U.S. PATENT DOCUMENTS

| | | | |
|---|---|---|---|
| 3,860,350 | 1/1975 | Rogers | 403/104 |
| 4,065,801 | 12/1977 | Leaming | 360/137 |
| 4,337,909 | 7/1982 | Harja | 242/199 |
| 4,470,089 | 9/1984 | Hutchins et al. | 360/137 |
| 4,748,526 | 5/1988 | Miyao et al. | 360/128 |
| 5,053,906 | 10/1991 | Rayis | 360/137 |

Primary Examiner—Stuart S. Levy
Assistant Examiner—William R. Korzuch
Attorney, Agent, or Firm—Basile and Hanlon

[57] ABSTRACT

A service cassette for simulating the presence of a conventional video tape cassette within a conventional video cassette recorder, player and camera wherein a retractable extending arm is provided for actuating a sensor that detects the presence and absence of an opaque magnetic video tape wherein the sensor is mounted beyond the frame structure of the service cassette within the video equipment. An extending arm is slidably connected to an end wall of at least one of the end members of a c-shaped frame structure of the service cassette. The slidable connection allows the extending arm to move between a retracted position and an extended position. When in the retracted position, the extending arm does not extend beyond the frame structure of the service cassette and does not actuate the sensor mounted beyond the frame structure of the service cassette within the video equipment. The retracted position provides the service cassette with the same size frame structure as a conventional video tape cassette for the accurate simulation thereof. When in the extended position, the extending arm extends beyond the frame structure of the service cassette to actuate the sensor mounted beyond the frame structure of the service cassette. The sensor may comprise a tension pole that pivots to engage video tape of a video tape cassette, or the sensor may comprise a photodetector that senses whether a beam of light passes through a clear or opaque section of video tape contained in a video tape cassette.

13 Claims, 3 Drawing Sheets

SERVICE CASSETTE EXTENSION FOR VIDEO CASSETTE RECORDER, PLAYER AND CAMERA

FIELD OF THE INVENTION

The present invention relates to video service cassettes, and in particular, a service cassette that simulates the presence of a conventional video tape cassette while providing an extending arm for actuating a sensor that detects the presence and absence of a magnetic video tape within the conventional video tape cassette, wherein the sensor is mounted beyond the frame structure of the service cassette within the conventional video cassette recorder, player and camera.

BACKGROUND OF THE INVENTION

The common use of video cassette recorders, players and cameras in the world today has led to a need for the maintenancing and servicing of such video equipment. Generally, the first attempts at servicing video cassette equipment provided attempts at blocking sensors with black tape or holding or taping safety switches within the video equipment. Attempts were also made to remove the internal mechanisms of the video tape cassette so that the shell of the video tape cassette could be utilized to activate some of the sensors and safety switches of the video equipment. Still, not all safety switches and sensors were activated, and the shell of the video tape cassette blocked many of the internal working mechanisms of the video equipment so that the technician could not view the internal mechanisms of the video equipment when in the operating mode. Today, service cassettes provide a frame structure that is similar to or identical to the frame structure of a conventional video tape cassette while providing an open center portion so that a technician can easily view the internal mechanisms of the video equipment.

Still, the frame structure of the service cassettes did not actuate and engage sensors within the video equipment that were mounted beyond the frame structure of the service cassette. One such sensor is a tension pole that engages the magnetic video tape of a conventional video tape cassette. The tension pole is connected to the end of a tension arm, and the other end of the tension arm is pivotally connected to a chassis of the video equipment, adjacent to the video tape cassette. The tension pole contacts the magnetic video tape beyond the frame structure of the video tape cassette and pushes the magnetic video tape outward by pivoting at the chassis of the video equipment. The tension arm is spring biased away from the video tape cassette to provide the proper tension on the magnetic video tape.

The tension arm is also connected to a tension band which wraps around a supply reel of the video equipment and is fixedly anchored to the chassis of the video equipment. The supply reel, in combination with a take-up reel of the video equipment, engage two spools of a conventional video tape cassette that hold and wind the magnetic video tape in the conventional video tape cassette. When the tension pole engages the magnetic video tape, slack is provided in the tension band to allow the supply reel to rotate. When the magnetic video tape is not present, the tension arm is free to swing away from the video cassette tape wherein the tension arm tightens the tension band and prohibits the supply reel from rotating. Since the tension pole engages the magnetic video tape beyond the frame structure of the service cassette, the service cassette does not engage the tension pole, and therefore, the tension band prohibits the supply reel from rotating and prohibits a technician from observing the continuous operation of the video equipment. The service cassette cannot be made larger to engage the tension pole since the service cassette would be larger than a conventional video tape cassette and, therefore, would not accurately simulate the use of a conventional video tape cassette.

All of the video cassette recorders, players and cameras produced by various manufacturers utilize common formats and standard size video tape cassettes even though the internal mechanisms within the video equipment which interact with the video tape cassette are designed somewhat differently from manufacturer to manufacturer. One such internal mechanism that is designed differently from manufacturer to manufacturer is a photodetector that determines the presence and absence of the magnetic video tape of the conventional video tape cassette. The magnetic video tape is normally provided with a clear leader and a clear trailer, each of which are several inches in length. The clear leader and trailer portions have the same general dimensions and flexibility as the other portions of the tape but lack the magnetic recording material, such as a ferrous oxide coating, normally found on the rest of the video tape. The clear leaders and trailers are substantially transparent and therefore allow light to shine therethrough, while the other portions of the video tape containing magnetic recording material are substantially opaque and block a beam of light. The presence or absence of the transparent leader or trailer is detected by one of two photodiodes spaced apart from one another and located next to the tape cassette handling mechanism within a video cassette recorder, player and camera and are used to tell the video equipment when to start and stop in the various modes of operation.

Generally, all video cassette recorder manufacturers provide such a photodetector to determine the presence of the beginning and the end of the magnetic video tape of a conventional video tape cassette, but not all video equipment manufacturers mount the photodetector in the same location. Most video cassette recorder manufacturers mount the photodetector adjacent to the conventional video cassette tape, and therefore, the frame structure of the service cassette will block the light to the photodetector thereby actuating the photodetector and sending the proper signal to the video equipment to allow the video equipment to perform the play and record functions. When the photodetector is mounted beyond the frame structure of the service cassette, the service cassette will not block the light source to the photodetector, and therefore, the correct signal is not sent to the video equipment. As previously mentioned, the service cassette cannot be made larger to engage the additional photodetector since the service cassette would be larger than a conventional video tape cassette and, therefore, would not accurately simulate the use of a conventional video tape cassette.

SUMMARY OF THE INVENTION

The present invention solves the above problems by providing a service cassette for simulating the presence of a conventional video tape cassette within a conventional video tape cassette recorder, player and camera wherein a retractable extending arm is provided for actuating a sensor that detects the presence and absence of a magnetic video tape and which is mounted beyond the frame structure of the service cassette within the video cassette recorder, player and camera. The service cassette provides a c-shaped frame structure that simulates the presence of a conventional video tape cassette while allowing a service technician to operate and observe the operation of mechanisms internal to the video equipment that are normally obscured by the presence of a conventional video tape cassette. The service cassette provides a retractable extending arm that moves between a retracted position and an extended position. When in the retracted position, the extending arm does not extend beyond the frame structure of the service cassette and thus does not actuate sensors mounted beyond the frame structure of the service cassette, but the retracted position does provide the service cassette with the same size frame structure as a conventional video tape cassette for the accurate simulation thereof. When in the extended position, the extending arm extends beyond the frame structure of the service cassette to actuate sensors mounted beyond the frame structure of the service cassette within the conventional video cassette recorder, player and camera.

The service cassette simulates the presence of a conventional video tape cassette when inserted into a conventional video cassette recorder, player and camera. This allows a service technician to put the video equipment into any one of its operating modes and readily observe the internal operation of the video equipment's tape cassette loading system and tape handling system which are normally obscured by a conventional video tape cassette. The service cassette has a substantially open structure having an elongated common member and two elongated end members that each extend perpendicularly from and are rigidly connected to opposite ends of the common member. The service cassette's structure and its members are arranged to provide a substantially open area that extends between the distal ends of the end members while providing almost complete unobstructed access to the tape loop area of the tape handling system of the video equipment, even when the service cassette is in the normal operating position for a conventional video tape cassette of the video equipment.

At the distal end of the two end members of the service cassette is an end wall that is substantially perpendicular to the end members. One of the end walls provides a slot therethrough wherein the extending arm slidably engages the slot. The extending arm slides within the slot between the retracted position and the extended position.

The extending arm provides flanges that extend substantially perpendicularly outward from opposite ends of the extending arm. A recess is provided in a portion of the end wall that defines the slot so that the flange and the extending arm sit in the recess of the end wall to provide a flush surface on the end wall when the extending arm is in the retracted position. The flange also abuts the recess portion of the end wall and prohibits the extending arm from extending beyond and out of the slot in the end wall. The second flange at the opposite end of the extending arm abuts the backside of the end wall when the extending arm is in the extended position. Again, the second flange abuts the backside of the end wall to prohibit the extending arm from extending beyond and out of the slot when in the extended position.

The object of the present invention is to provide a new and improved service cassette that simulates the presence of a conventional video tape cassette in a conventional video cassette recorder, player and camera while providing a retractable extending arm that moves between an extended position, wherein the extending arm extends beyond the frame structure of the service cassette to actuate a sensor that detects the presence and absence of a magnetic video tape and which is mounted beyond the frame structure of the service cassette within the video cassette recorder, player and camera, and a retracted position, wherein the extending arm does not extend beyond the frame structure of the service cassette and thus does not actuate the sensor of the video cassette recorder, player and camera but provides the service cassette with the same size frame structure as a conventional video tape cassette for accurate simulation thereof.

Other objects, advantages and applications of the present invention will become apparent to those skilled in the art when the following description of the best mode contemplated for practicing the invention is read in conjunction with the accompanying drawings.

DESCRIPTION OF THE PREFERRED EMBODIMENT

Figures 1, 2:
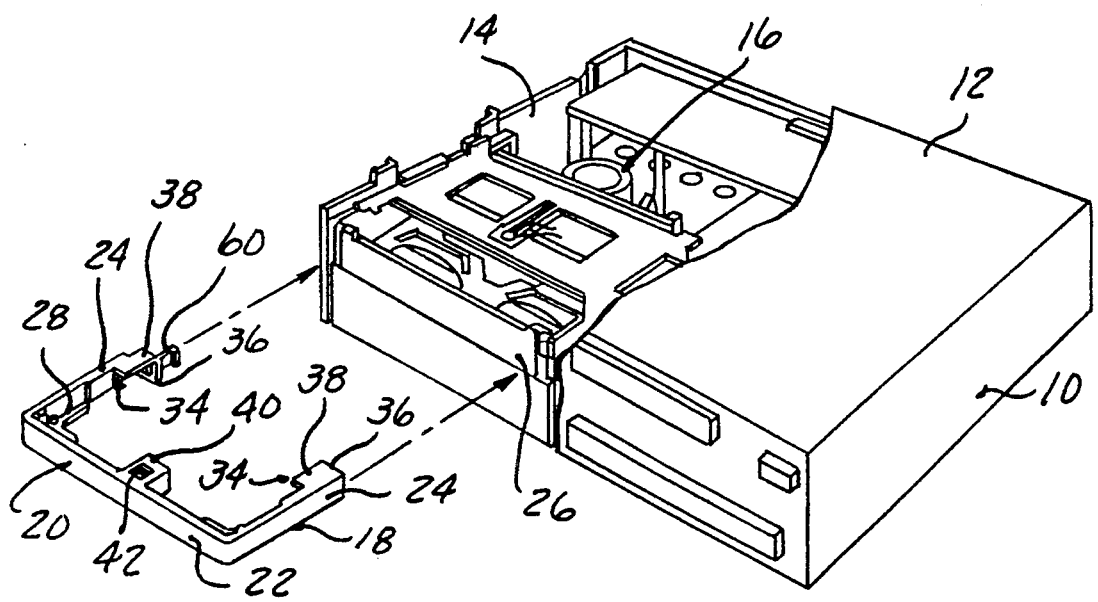
FIG. 1 is a perspective view of a conventional video cassette recorder shown partially broken away with the service cassette of the present invention poised for insertion into the cassette handling system of the video cassette recorder.
FIG. 2 is a diagram showing the path of a magnetic video tape in a conventional video cassette recorder, showing a photodetector mounted beyond the frame structure of the service cassette wherein the frame structure does not block a light source to the photodetector and showing a photodetector mounted adjacent to a service cassette wherein the frame structure of the service cassette blocks the light source to the photodetector.

Referring to the drawings, the present invention will now be described in detail with reference to the preferred embodiment.

FIG. 1 shows a conventional video cassette recorder 10 having a rectangular box-like cover 12 shown partially broken away to partially reveal the video tape cassette loading system 14 and tape handling system 16. A service cassette 18 of the present invention is shown poised for insertion into the video cassette recorder 10. The service cassette 18 provides a c-shaped frame structure 20 having a common member 22 and two end members 24 each extending perpendicularly from the common member 22. The overall length, width and height are substantially equal to the overall length, width and height of a conventional video tape cassette (not shown) in order to provide accurate simulation of a conventional video tape cassette. The service cassette 18 is inserted into and through the door 26 of the tape loading system 14 and is internally handled by the video cassette recorder 10 just like a conventional video tape cassette. It should be noted that the service cassette 18 may be utilized with any video equipment that uses a conventional video tape cassette, such as a video cassette recorder, player or camera. The video cassette recorder 10 shown in the drawings and referred to in the specifications is simply for illustration purposes and is not intended to limit the use of the present invention to simply a video cassette recorder.

Figure 3:
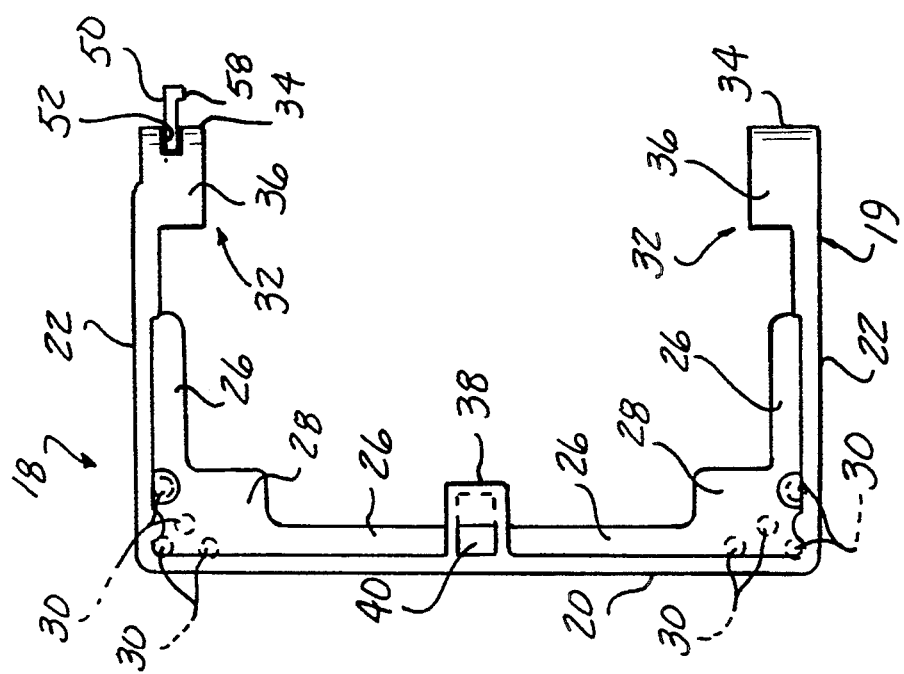
FIG. 3 is a top view of the service cassette showing the extending arm in the extended position.

In order to actuate the necessary sensors and switches within the video cassette recorder 10, the service cassette 18 provides the necessary features to accurately simulate a conventional video tape cassette. As seen in FIGS. 1 and 3, the end members 24 of the service cassette 18 have a substantially uniform thickness over most of their length. Strengthening ribs 28 are provided along a portion of the end members 24 and the common member 22 on the bottom of the service cassette 18. The strengthening ribs 28 provide additional rigidity against flexing of the end members 24 and the common member 22 to further simulate a conventional video tape cassette. The strengthening ribs 28 are integral with a pair of stationary pads 30 that are located in the interior corners formed by the joining of the common member 22 and the two end members 24. The stationary pads 30 provide a means for actuating cassette-in-position switches (not shown) found in the tape handling system 16 of almost all video cassette recorders 10. A plurality of apertures 32 are provided on the underside of the stationary pads 30 to actuate cassette-in-position switches that are mounted in different areas of the video cassette recorder 10 depending on the manufacturer. When the cassette-in-position switches are activated, a signal is provided to the video cassette recorder 10 that a conventional video tape cassette has been properly lowered into the operating position.

Figure 4:
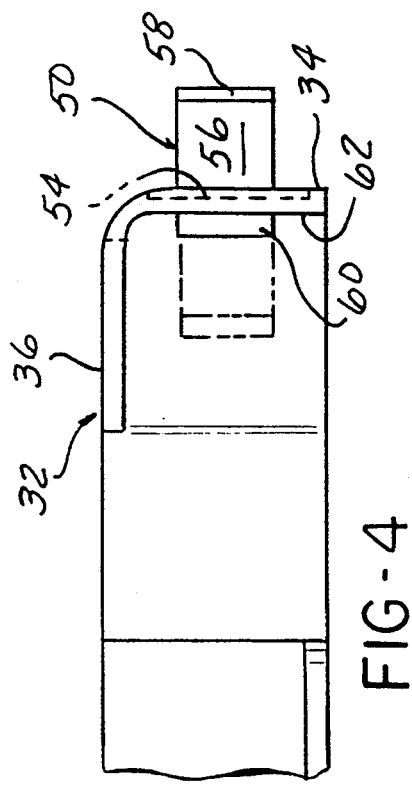
FIG. 4 is an enlarged side view showing the extending arm in an extended position and showing, in phantom line, the extending arm in the retracted position.

As seen in FIGS. 1, 3 and 4, the two end members 24 terminate at distal ends 34 with a short end wall 36 and a roof portion 38 extending at right angles to the rest of the end member 24. The end walls 36 of the end members 24 butt against stop pads (not shown) within the video cassette recorder 10 to properly position a conventional video tape cassette. The roof portions 38 of the end members 24 contact guides or leaf springs (not shown) extending down from the top of the video cassette recorder 10 to correctly position a conventional video tape cassette within the drawer (not shown) of the video cassette handling system 16.

As seen in FIGS. 1 and 3, a small enclosure 40 is integral with and extends from the center most portion of the common member 22 towards the internal open portion of the service cassette 18. The enclosure 40 provides an aperture 42 therethrough for receiving a post member (not shown) that normally unlocks the tape reels (not shown) of a conventional video tape cassette so that the tape reels are released to perform the normal operations of a conventional video tape cassette. The engagement of the post member within the aperture 42 provides added stability to the service cassette 18 when loaded into the video cassette recorder 10.

Figure 6A:
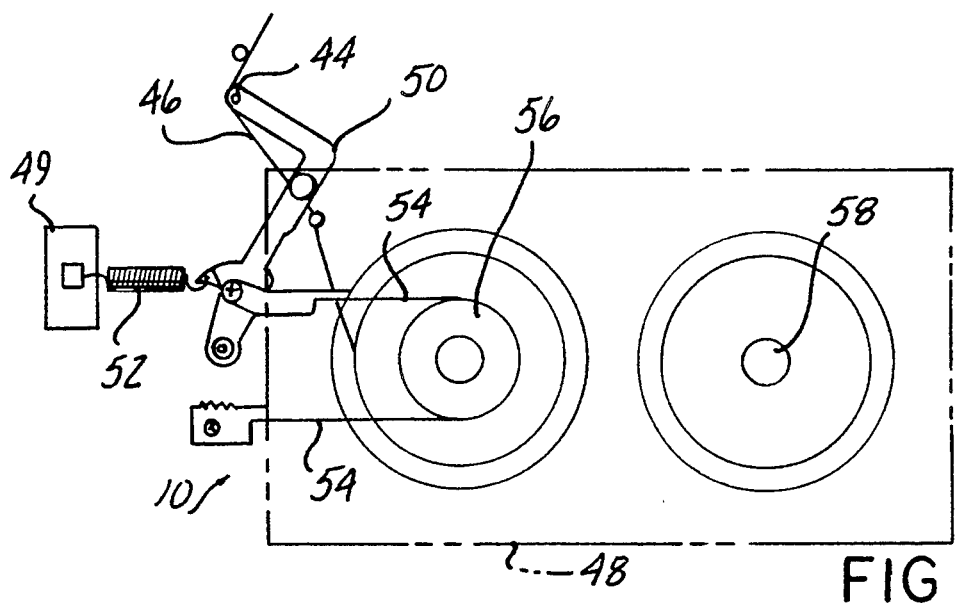
FIG. 6A is a diagram showing the tension pole of a conventional video cassette recorder engaging the magnetic video tape of the conventional video tape cassette.

Typically, conventional video cassette recorders, players and cameras provide sensors that are mounted beyond the frame structure 20 of the service cassette 18 and, therefore, are not actuated by the frame structure 20 of the service cassette 18. As part of the tape handling system 16 for the video cassette recorder 10, a tension pole 44 engages a magnetic video tape 46 of a conventional video tape cassette 48 to provide the proper level of tension to the magnetic video tape 46, as seen in FIG. 6A. The tension pole 44 is connected to one end of a tension arm 50 which in turn has its other end pivotally connected to a chassis 49 of the video cassette recorder 10. An axial tension spring 52 urges the tension arm 50 away from the conventional video tape cassette 48 to provide a predetermined level of tension on the magnetic video tape 46.

Figure 6B:
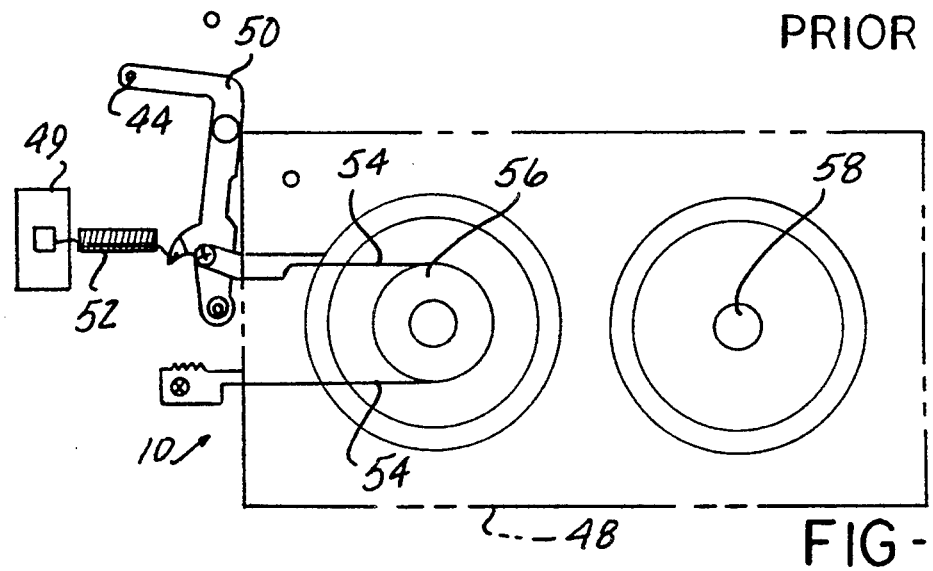
FIG. 6B is a diagram showing the tension pole of a conventional video cassette recorder not engaging the magnetic video tape of a conventional video tape cassette thereby tightening the tension band and prohibiting the supply reel from rotating.
Figure 6C:
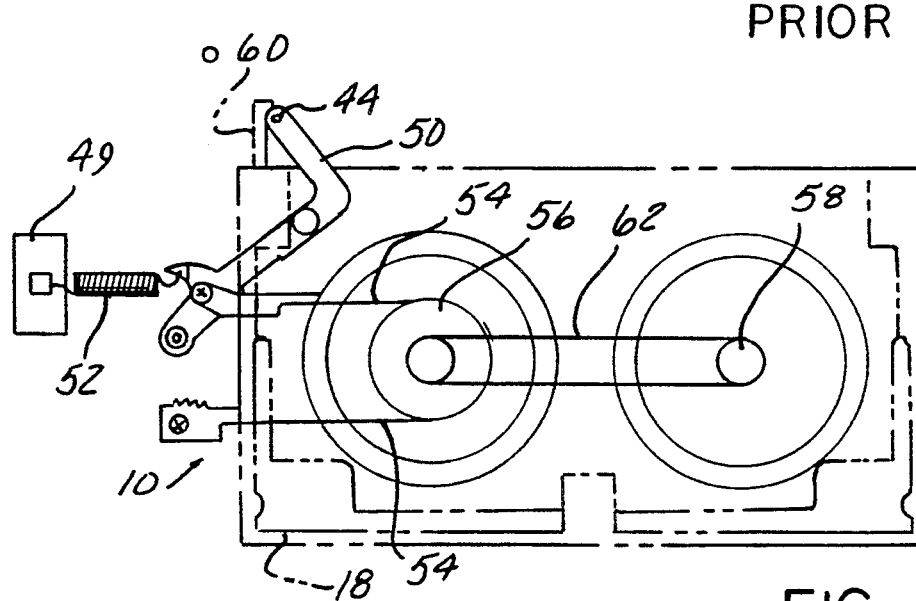
FIG. 6C is a diagram showing the tension pole of a conventional video cassette recorder engaging the extension arm of the service cassette and utilizing the continuous elastic belt to rotatably couple the supply reel to the take-up reel to maintain continuous operation of the video cassette recorder.

Besides providing tension to the magnetic video tape 46, the tension pole 44 also works to detect the presence and absence of the magnetic video tape 46 of a conventional video tape cassette 48. To accomplish this, a tension band 54 is wrapped around a supply reel 56 of the video cassette recorder 10, as seen in FIGS. 6A-C. The tension band 54 has one of its ends connected to the tension arm 50, and its other end anchored to the video cassette recorder 10, together with the axial tension spring 52 that is connected to the tension arm 50.

When a conventional video tape cassette 48 is inserted into the video cassette recorder 10 and placed in any operating mode, the tension pole 44 pivots counter-clockwise to engage the magnetic video tape 46 and provide the proper level of tension to the magnetic video tape 46, as seen in FIG. 6A. When the tension pole 44 engages the magnetic video tape 46, the tension band 54 has a designed length such that the tension band 54 provides enough slack to allow the supply reel 56 to rotate when driven by a take-up reel 58 of the video cassette recorder 10 via the pulling of the magnetic video tape 46, as seen in FIG. 6B. When the conventional video cassette recorder 10 is placed into a play or record mode without the conventional video tape cassette 48 loaded in the video cassette recorder 10, the tension pole 44 pivots away from the video tape cassette 48 and tightens the tension band 54 around the supply reel 56 so that the supply reel 56 cannot rotate.

Reel sensors (not shown) are provided to determine whether the supply reel 56 and take-up reel 58 are rotating. If both the supply reel 56 and the take-up reel 58 are rotating, the reel sensors send a signal to the video cassette recorder 10 that the reels 56, 58 are rotating, and the video cassette recorder 10 continues to operate. If the tension pole 44 does not engage the magnetic video tape 46, and the tension band 54 prohibits the supply reel 56 from rotating, then the reel sensors will send a signal to the video cassette recorder 10 that the supply reel 56 is not rotating, and the video cassette recorder 10 will automatically stop playing.

Since the tension pole 44 extends beyond the frame structure 20 of the service cassette 18, the frame structure 20 of the service cassette 18 cannot be utilized to engage the tension pole 44. To prohibit the tension pole 44 from swinging counter-clockwise when the video cassette recorder 10 is placed in a record or play mode without a conventional video tape cassette 48 loaded in the video cassette recorder 10, a retractable extending arm 60, as will be described in detail later, is provided in the end wall 36 of one of the end members 24 of the service cassette 18 to engage the tension pole 44 when the extending arm 60 is extended beyond the frame structure 20 of the service cassette 18, as seen in FIG. 6C. By the tension pole 44 engaging the extending arm 60, the tension band 54 provides enough slack to allow the supply reel 56 to rotate.

When a conventional video tape cassette 48 is not present, the supply reel 56 is not driven by the take-up reel 58 via the magnetic video tape 46, and the reel sensors determine that the supply reel 56 is not rotating thus stopping the video cassette recorder 10. Continuous operation of the video cassette recorder 10 is maintained by rotatably coupling the supply reel 56 and the take-up reel 58 with a continuous elastic belt 62 that is placed around the supply reel 56 and the take-up reel 58, as seen in FIGS. 6C. The take-up reel 58 drives the elastic belt 62 which in turn rotates the supply reel 56. The rotation of the supply reel 56 and the take-up reel 58 actuates the reel sensors to provide continuous operation of the video cassette recorder 10 for observing and servicing the video cassette recorder 10.

Another sensor that is occasionally mounted beyond the frame structure 20 of the service cassette 18 within the video cassette recorder 10 is a photodetector for detecting the presence and absence of the magnetic video tape 46. As part of the controls for the tape handling system 16 of the video cassette recorder 10, a light source 66, which may include a light emitting diode, neon bulb or other light, is provided along with a pair of photodetector assemblies 68, each including a photodiode 70, as seen in FIG. 2. As is well known, the purpose of the light source 66 and the photodetectors 68 is to determine when the magnetic video tape 46 in a conventional video tape cassette 48 is at its beginning or at its end. Two beams of light 72 emanate through light passages within the conventional video tape cassette 48 and through apertures (not shown) provided in frame members (not shown) of the loading system 14 to actuate the photodetectors 68.

When the photodetectors 68 are mounted adjacent to the service cassette 18, as shown in FIG. 2, the distal ends 34 of the end members 24 block the light beams 72 to provide a signal to the video cassette recorder 10 that the magnetic video tape 46 of the conventional video tape cassette 48 is present and that the magnetic video tape 46 is not at its beginning or end. In order for the end members 24 of the service cassette 18 to be able to block the light beam 72 of the light source 66, the end members 24 are fabricated from a material which is opaque to the transmission of light at the wavelengths emitted by the light source 66. Thus, when the service cassette 18 is loaded into the video cassette recorder 10, all modes of operation of the video cassette recorder 10 may be successfully checked by a service technician using the service cassette 18.

Some video cassette equipment manufacturers mount an extended photodetector 64 beyond the frame structure 20 of the service cassette 18, as shown in FIG. 2. When the light beam 72 to the extended photodetector 64 is blocked, the video cassette recorder 10 receives a signal that the magnetic video tape 46 is not at it's beginning or end, and therefore, the video cassette recorder 10 may proceed in the record and play modes. Since the extended photodetector 64 is mounted beyond the frame structure 20 of the service cassette 18, the light beam 72 is not blocked by the end members 24 of the service cassette 18.

To block the light beam 72 to the extended photodetector 64 without effecting the simulation of a conventional video tape cassette and without providing an additional and separate means for actuating the extended photodetector 64, the same retractable extending arm 60 provided in the service cassette 18 that is utilized to engage the tension pole 44 previously described, may also be used to block the light beam 72 to the extended photodetector 64, as seen in FIGS. 1 and 3-5B. The end wall 36 provides a vertical slot 74 therethrough and a recess 76 along a portion of the end wall 36 that defines the slot 74. The extending arm 60 has a rectangular body 78 with a front flange 80 and a rear flange 82 extending perpendicularly from and integral with opposite ends of the extending arm 60. The body 78 of the extending arm 60 is slightly smaller in width than the width of the slot 74 in the end wall 36. The body 78 of the extending arm 60 slides within the slot 74 so that the extending arm 60 may move between a retracted position and an extended position. When in the retracted position, the extending arm 60 does not extend beyond the frame structure 20 of the service cassette 18, does not block the light beam 72 of the photodetector 64 and does not engage the tension pole 44 of the video cassette recorder 10. When in the extended position, the extending arm 60 extends beyond the frame structure 20 of the service cassette 18 to block the light beam 72 of the photodetector 64 and to engage the tension pole 44 that is mounted beyond the frame structure 20 of the service cassette 18 within the video cassette recorder 10. When the extending arm 60 is in the retracted position, the frame structure 20 of the service cassette 18 remains the same size as the frame structure of a conventional video tape cassette, and therefore, the service cassette 18 remains an accurate simulation of a conventional video tape cassette.

Figure 5A:
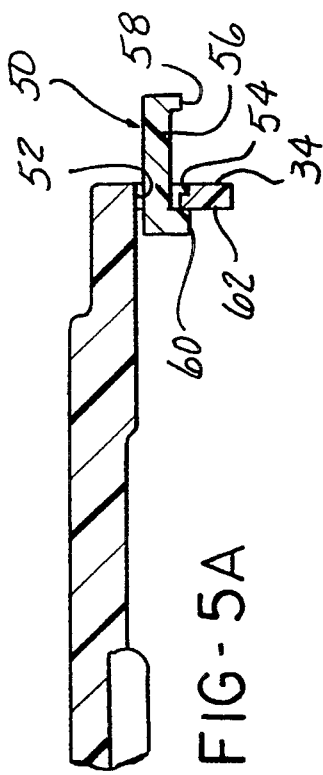
FIG. 5A is a section view in the direction of arrows 5—5 in FIG. 4 showing the rear flange of the extending arm abutting the backside of the end wall when the extending arm is in the extended position.
Figure 5B:
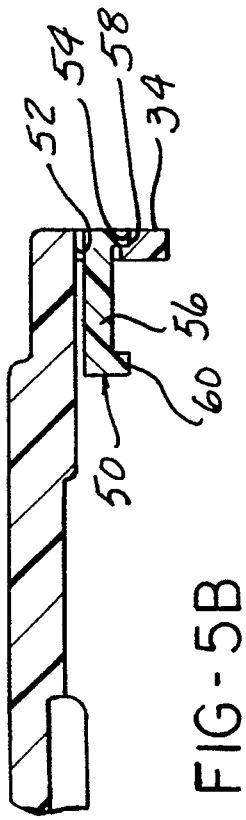
FIG. 5B is a section view in the direction of arrows 5—5 in FIG. 4 showing the front flange seated in the recess of the end wall when the extending arm is in the retracted position.

When in the retracted position, as seen in FIG. 5B and shown in phantom line of FIG. 4, the front flange 80 of the extending arm 60 sits flush in the recess 76 of the end wall 36 in order to maintain an accurate simulation of a conventional video tape cassette. The front flange 80 also acts to prohibit the extending arm 60 from extending beyond and out of the slot 74 provided in the end wall 36 of the end member 24. When in the extended position, as seen in FIGS. 4 and 5A, the rear flange 82 of the extending arm 60 abuts a back side 84 of the end wall 36 of the end member 24 to prohibit the extending arm 60 from extending beyond and out of the slot 74 provided in the end wall 36 of the end member 24.

The service cassette 18 and extending arm 60 may be made from any suitably rigid material, including almost any conventional impact resistant plastic material out of which enclosures for conventional video tape cassettes are made. Suitable high strength polymeric materials include AVS, class A sheet molding materials, plastic injection molding materials including nylon, BVC materials, and the like. Preferably the material is fairly smooth and is electrically non-conductive. If desired, a metallic wire frame having a c-shaped configuration may be employed, provided that the wire frame is coated or has molded thereupon a final coating of an electrically insulated smooth material.

In order to use the service cassette 18 for servicing the video cassette recorder 10, the extending arm 60 of the service cassette 18 is placed in the retracted position so that the front flange 80 of the extending arm 60 is flush with the end wall 34 of the end member 24. The retracted position of the extending arm 60 provides the service cassette 18 with the same size frame structure 20 as a conventional video tape cassette in order to accurately simulate the presence of a conventional video tape cassette. The service cassette 18 is inserted into the cassette loading system 14 of the video cassette recorder 10 and is loaded automatically by the video cassette recorder 10.

When the technician realizes that the conventional video cassette recorder 10 has a tension pole 44, as the one previously described, the technician slides the extending arm 60 into the extended position so that the tension pole 44 engages the extending arm 60 when the video cassette recorder 10 is placed in a play or record mode. If reel sensors prohibit the continuous operation of the video cassette recorder 10, then the technician places the continuous elastic belt 62 around both the supply reel 56 and the take-up reel 58 while leaving the service cassette 18 loaded in the video cassette recorder 10. The technician may then place the video cassette recorder 10 in a play and record mode and have the video cassette recorder 10 continually operate so that the technician can observe the operation of the video cassette recorder 10.

When the technician realizes that the extended photodetector 64 is mounted beyond the frame structure 20 of the service cassette 18, the technician slides the extending arm 60 into the extended position to block the light beam 72 to the extended photodetector 64 of the video cassette recorder 10. This may be accomplished while the service cassette 18 is loaded in the video cassette recorder 10. Once the extending arm 60 blocks the light beam 72 of the photodetector 64 of the video cassette recorder 10, the video cassette recorder 10 receives the proper signal that the magnetic video tape 46 is not at its beginning or end, and the video cassette recorder 10 continues to operate.

To unload the service cassette 18 from the video cassette recorder 10, the technician may eject the service cassette 18 with the extending arm 60 in the extended position. It is not necessary to move the extending arm 60 back to the retracted position when unloading the service cassette 18 from the video cassette recorder 10, but the technician may wish to move the extending arm 60 to the retracted position to better simulate a conventional video tape cassette being unloaded from the video cassette recorder 10.

It should be noted that the present invention is not limited to a sliding engagement for moving the extending arm 60 between the retracted position and the extended position, but rather, the extending arm 60 may be moved between such positions through any number of means for movement such as pivotal movement, telescopic movement, rotational movement, etc.

It is again noted that the present invention may be utilized with any video equipment that uses a conventional video tape cassette, such as a video cassette recorder, player and camera.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A service cassette for a video cassette recorder, player and camera having a sensor for detecting the presence and absence of opaque magnetic video tape, and having a supply reel and a take-up reel with reel sensors to determine whether the supply reel and the take-up reel are rotating in order to maintain continuous operation of the video cassette recorder, player and camera, and the service cassette simulating the presence of a video tape cassette when inserted into the video cassette recorder, player and camera, for allowing a service technician to operate the video cassette recorder, player and camera in one or more operating modes to observe the operation of mechanisms internal to the video cassette recorder, player and camera that are normally obscured by the presence of a video tape cassette, the service cassette comprising:

a frame structure having at least a common member and two end members that each extend perpendicularly from and are rigidly connected to said common member, and said frame structure having at least one substantially open area between said end members to provide an open area that allows significant access to the tape handling system of the video cassette recorder, player and camera even when said service cassette is in a operating position for a video tape cassette within the video cassette recorder, player and camera;

means for actuating the sensor for detecting the presence and absence of opaque magnetic recording tape in the video cassette recorder, player and camera wherein the sensor is mounted beyond said frame structure of said service cassette so that said frame structure of said service cassette does not actuate the sensor when loaded in the video cassette recorder, player and camera; and means for movably connecting said actuating means to said frame structure of said service cassette so that said actuating means moves between a retracted position, wherein said actuating means does not actuate the sensor, and an extended position, wherein said actuating means actuates the sensor.

2. The service cassette stated in claim 1, including means for rotatably coupling the take-up reel with the supply reel to simulate the presence of a video tape cassette by having said rotatable coupling means turn said supply reel when said take-up reel is driven by the video cassette recorder, player and camera thereby actuating the reel sensors to maintain continuous operation of the video cassette recorder, player and camera.

3. The service cassette stated in claim 1, wherein the sensor is mechanically actuated.

4. The service cassette stated in claim 1, wherein the sensor is a light emitting diode.

5. A service cassette for a video cassette recorder, player and camera having a sensor for detecting the presence and absence of opaque magnetic video tape, and having a supply reel and a take-up reel with reel sensors to determine whether the supply reel and the take-up reel are rotating in order to maintain continuous operation of the video cassette recorder, player and camera, and the service cassette simulating the presence of a video tape cassette when inserted into the video cassette recorder, player and camera, for allowing a service technician to operate the video cassette recorder, player and camera in one or more operating modes to observe the operation of mechanisms internal to the video cassette recorder, player and camera that are normally obscured by the presence of a video tape cassette, the service cassette comprising:

- a frame structure having at least a common member and two end members that each extend perpendicularly from and are rigidly connected to said common member, and said frame structure having at least one substantially open area between said end members to provide an open area that allows significant access to the tape handling system of the video cassette recorder, player and camera even when the service cassette is in a operating position for a video tape cassette within the video cassette recorder, player and camera;
- an extending arm extending beyond said frame structure of said service cassette to actuate the sensor for detecting the presence and absence of opaque magnetic video tape in the video cassette recorder, player and camera wherein the sensor is mounted beyond said frame structure of said service cassette so that said frame structure of said service cassette does actuate the sensor when loaded in the video cassette recorder, player and camera; and
- means for movably connecting said extending arm to said frame structure of said service cassette so that said extending arm moves between a retracted position, wherein said extending arm does not extend beyond said frame structure and does not actuate the sensor, and an extended position, wherein said extended arm extends beyond said frame structure to actuate the sensor.

6. The service cassette stated in claim 5 wherein said means for movably connecting comprises;

- at least one of said two end members having an end wall at a distal end of said at least one of said two end members, and said end wall having a slot therethrough;
- said extending arm slidably engaging said slot for moving said extending arm between said retracted position and said extended position; and
- a pair of flanges integral with and extending from opposite ends of said extending arm so that said pair of flanges engage said end wall when in said retracted position and said extended position to prohibit said extending arm from extending beyond and out of said slot.

7. The service cassette stated in claim 5, including a continuous belt coupling the supply reel to the take-up reel for simulating the presence of a video tape cassette by rotating the supply reel when the take-up reel is rotatably driven during operation of the video cassette recorder, player and camera, thereby actuating the reel sensors to maintain continuous operation thereof.

8. The service cassette stated in claim 5, wherein the sensor provides means for adjustably applying tension on the supply reel of the video cassette recorder, player and camera.

9. The service cassette stated in claim 5, wherein the sensor provides a light beam and a light diode for receiving said light beam.

10. A service cassette for a video cassette recorder, player and camera having a sensor for detecting the presence and absence of opaque magnetic video tape, and having a supply reel and a take-up reel with reel sensors to determine whether the supply reel and the take-up reel are rotating in order to maintain continuous operation of the video cassette recorder, player and camera, and the service cassette simulating the presence of a video tape cassette when inserted into the video cassette recorder, player and camera, for allowing a service technician to operate the video cassette recorder, player and camera in one or more operating modes to observe the operation of mechanisms internal to the video cassette recorder, player and camera that are normally obscured by the presence of a video tape cassette, the service cassette comprising:

- a frame structure having at least a common member and two end members that each extend perpendicularly from and are rigidly connected to the common member, said frame structure having at least one substantially open area between said end members to provide an open area that allows significant access to the tape handling system of the video cassette recorder, player and camera even when said service cassette is in a operating position for a video tape cassette within the video cassette recorder, player and camera;
- an end wall at a distal end of each of said two end members, and said end walls being substantially perpendicular to said end members, and said end wall having a front side and a back side;
- at least one of said end walls having a slot therethrough;
- said front side of said slotted end wall having a recess in a portion of said end wall that defines said slot;
- an extending arm having a substantially rectangular body, a front flange and a rear flange integral with and extending substantially perpendicular from opposite ends of said body of said extending arm;
- said body of said extending arm slidably engaging said slot for moving between a retracted position, wherein said extending arm does not extend beyond said frame structure and does not actuate the sensor, and an extended position, wherein said extending arm extends beyond said frame structure to actuate the sensor;
- said front flange being seated in said recess of said front side of said end wall when said extending arm is in said retracted position so that said front flange is flush with said end wall to prohibit said extending arm from extending beyond and out of said slot and to allow said frame structure to fully simulate a video tape cassette by not having said extending arm extend beyond said frame structure; and
- said rear flange abutting said back side of said end wall when said extending arm is in said extended position to prohibit said extending arm from extending beyond and out of said slot.

11. The service cassette stated in claim 10, including a continuous elastic belt rotatably coupling the supply reel to the take-up reel for simulating the presence of a video tape cassette by rotating the supply reel when the take-up reel is rotatably driven during operation of the video cassette recorder, player and camera, thereby actuating the reel sensors to maintain continuous operation thereof.

12. The service cassette stated in claim 10, wherein the sensor comprises:
- a tension arm pivotally connected to the video cassette recorder, player and camera;
- a tension band having opposite ends connected to said tension arm and the video cassette recorder, player and camera and a middle portion of said tension band extending around the supply reel of the video cassette recorder, player and camera; and
- means for moving said tension arm between a first position, wherein a proper amount of tension is applied to said tension band to allow the supply reel to rotate in response to the driving of the take-up reel of the video cassette recorder, player and camera, and a second position, wherein said tension arm moves to provide a level of tension on said tension band that prevents the supply reel from rotating when the take-up reel rotates and drives the rotation of the supply reel of the video cassette recorder, player and camera.

13. The service cassette stated in claim 10, wherein the sensor comprises:
- means for emitting a light beam;
- a light diode for receiving and responding to said light beam emitting means.

* * * * *